United States Patent
Töyrylä et al.

(10) Patent No.: US 6,999,783 B2
(45) Date of Patent: Feb. 14, 2006

(54) METHOD FOR CREATING A DYNAMIC TALK GROUP

(75) Inventors: Hannu Töyrylä, Helsinki (FI); Markku Vimpari, Oulu (FI)

(73) Assignee: Nokia Corporation, Espoo (FI)

( * ) Notice: Subject to any disclaimer, the term of this patent is extended or adjusted under 35 U.S.C. 154(b) by 628 days.

(21) Appl. No.: 09/985,169

(22) Filed: Nov. 1, 2001

(65) Prior Publication Data

US 2003/0083086 A1    May 1, 2003

(51) Int. Cl.
*H04Q 7/20*    (2006.01)
(52) U.S. Cl. ..................... 455/519; 455/520
(58) Field of Classification Search ............... 455/518, 455/519, 520
See application file for complete search history.

(56) References Cited

U.S. PATENT DOCUMENTS

| | | | |
|---|---|---|---|
| 5,513,381 A | 4/1996 | Sasuta | |
| 6,253,091 B1 | 6/2001 | Naddell et al. | |
| 6,275,500 B1 * | 8/2001 | Callaway et al. | 370/449 |
| 6,600,928 B1 * | 7/2003 | Ahya et al. | 455/518 |
| 6,647,020 B1 * | 11/2003 | Maher et al. | 455/518 X |

FOREIGN PATENT DOCUMENTS

| WO | WO 01/27785 | 4/2001 |
|---|---|---|
| WO | WO 01/45310 | 6/2001 |
| WO | WO 01/73985 | 10/2001 |

* cited by examiner

*Primary Examiner*—Nay Maung
*Assistant Examiner*—Philip J. Sobutka
(74) *Attorney, Agent, or Firm*—Pillsbury Winthrop Shaw Pittman LLP (57) ABSTRACT

The invention relates to dynamically creating talk groups in a communications system. A new dynamic group is created by a user who defines a group definition message in his subscriber station. This group definition message uniquely identifies the new group in the system, and can be distributed to the intended group members using the usual messaging facilities available in the specific communications system. The recipients of the group definition message can store the message in their subscriber stations for subsequent use. Thus, group creation and membership management are handled at user level without interacting with the system. The role of the system is restricted to establishing a means for communication in the group whenever there are users who have activated the group for communication.

16 Claims, 3 Drawing Sheets

METHOD FOR CREATING A DYNAMIC TALK GROUP

FIELD OF THE INVENTION

The invention relates to communications systems, and especially to group communication in communications systems.

BACKGROUND OF THE INVENTION

A mobile communications system refers generally to any telecommunications system which enables wireless communication when users are moving within the service area of the system. A typical mobile communications system is a Public Land Mobile Network (PLMN). Often the mobile communications network is an access network providing a user with wireless access to external networks, hosts, or services offered by specific service providers.

One special feature offered in mobile communications systems by PMR systems is group communication. Conventionally group communication has been available only in trunked communications systems, such as Professional Radio or Private Mobile Radio (PMR) systems which are special radio systems primarily intended for professional and governmental users, such as the police, military forces, oil plants. However, the group communication is now becoming available also in public mobile communications systems. The term "group", as used herein, refers to any logical group of three or more users for participating in the same group communication, e.g. a speech call. The same user may be a member of more than one group communication group. Typically, the members of the group communication group belong to the same organization, such as the police, the fire brigade, a private company, etc. Also, typically, the same organization has several separate groups, i.e. a set of groups.

Group communication has conventionally been based on predefined, rather static groups. In the first generation of conventional PMR systems, communication was based on access to physical radio channels. Radio channels were physically installed into mobile radio stations, the use of each radio channel was based on an agreement between the users. As it was not possible to dynamically introduce new radio channels into mobile radio stations, it was in principle possible to dynamically modify the agreement concerning which kind of traffic to be conducted on which radio channel. In practice this was difficult to achieve, and furthermore it was not possible to exclude users from having access to channels if they once were installed. To allow differentiation between groups on same physical channels, various selective call methods were introduced. Even these were based on the selective call information that was physically programmed into a mobile station. More dynamic approaches did not appear until more sophisticated signaling methods, which made it possible to exchange information in both directions between mobiles and a system control unit, were adopted. Special signaling messages could then be adopted to carry the regrouping information. Problems with reliability were common, because the loss of a message resulted in incomplete group membership.

In older and simpler systems the group membership was known only to the mobile stations. In more recent systems the group membership is known to both the system and the mobiles. The latter case provides many functional advantages (such as allowing the system to allocate resources only when being actually required by a group member) but makes the dynamic re-grouping technically more demanding and complex. The information in the system and the mobiles must match with one another. This is usually achieved by arranging the radio system to hold a master copy of the group information. This works well as far as it is enough to perform group management from a fixed terminal connected to the network infrastructure.

Various ways have existed for a long time to create new talk groups and/or modify group membership more dynamically. A need has particularly arisen to create and manage groups from mobiles. This has led to a two-phase solution: the user from the mobile has to communicate, using specialized signaling, with the system control unit, which stores the information, creates the group and distributes the information to other mobiles, again using specialized signaling. The problem with such a dynamic talk group functionality has been that the technical implementation thereof has been complex, and that said functionality has been difficult and unreliable from the user's point of view.

In addition to conventional PMR users, group communication is also attractive to users of modern public cellular networks. For example, private persons might want to participate in talk groups, such as hobby groups, sport groups, etc. Small business users may also use the group communication feature for a more frequent job-related communication during a working day within the same work group, either within the company or a business community.

SUMMARY OF THE INVENTION

An object of the invention is to provide a technically simple method for creating a dynamic group.

An aspect of the invention is a method for dynamically creating talk groups in a communications system, comprising defining a dynamic talk group by a user of a first subscriber station, said group having at least two group members including said user, sending a group definition message from said first subscriber station to subscriber stations of other members in said group, said group definition message containing group definition information which includes at least a group identifier, storing said group definition information in said subscriber stations for subsequent use.

A further aspect of the invention is a method for dynamically creating talk groups in a communications system, comprising defining a dynamic talk group by a user of a first subscriber station, said group having at least two group members, sending a group definition message from said first subscriber station to subscriber stations of other members in said group, said group definition message containing group definition information which includes at least a group identifier, storing said group definition information in said subscriber stations for subsequent use, establishing said dynamic talk group in the communications system by sending a group activation message from one of said members in said group to the communications system, said group activation message containing at least said group identifier and optionally additional information from said stored group definition information.

A still further aspect of the invention is a method for dynamically creating talk groups in a communications system, comprising creating a dynamic talk group by a first subscriber, communicating group definition information on said dynamic talk group from said first subscriber to one or more other subscribers who are intended members of said dynamic talk group in addition to said first subscriber, storing said group definition information in subscriber stations of said subscribers, establishing said dynamic talk group on a network side of said communications system only when at least one of said subscribers registers as an active member in said group by sending a group activation message to the network side, said group activation message containing at least some of said group definition information stored in said subscriber stations of said subscribers, de-establishing said dynamic talk group established on the network side of said communications system when none of said subscribers is no longer registered as an active member of said dynamic talk group on the network side, while still storing said group definition information in said subscriber stations for enabling possible re-establishment of said dynamic talk group.

A further aspect of the invention is a communications system, comprising a communication network having a talk group communication service, a plurality of subscriber stations, at least some of said subscriber stations comprising i) user-operated means for defining a dynamic talk group including a user of the respective subscriber station, ii) means for sending a group definition message to subscriber stations of the intended other members in said defined dynamic talk group over said communication network, said group definition message containing group definition information which includes at least a group identifier, iii) means for storing said group definition information and possible other group definition information on one or more other talk groups received from any other subscriber station, for subsequent use.

A still further aspect of the invention is a subscriber station for a communications system, comprising user-operated means for defining a dynamic talk group including a user of the subscriber station, means for sending a group definition message to subscriber stations of intended other members of said defined dynamic talk group over a communication network, said group definition message containing group definition information which includes at least a group identifier, means for storing said group definition information and possible other group definition information on one or more other talk groups received from any other subscriber station, for subsequent use.

A further aspect of the invention is a talk group communication service system for a communications system, comprising means for receiving a group activation message from a subscriber station, said group activation message containing at least a group identifier and optionally additional group definition information, means for checking whether a dynamic talk group corresponding to said group identifier is already established, means responsive to said dynamic talk group not yet established for establishing said dynamic talk group on the basis of said received group definition information and registering a user of said subscriber station as an active member of said dynamic talk group, means responsive to said dynamic talk group already established for registering a user of said subscriber station as an active member of said dynamic talk group.

Contrary to the prior art solutions, the present invention does not approach the dynamic group creation from the system point of view but rather from the perspective of the user. A new dynamic group is created by a user, who defines a group definition message into his subscriber station. This group definition message uniquely identifies the new group in the system, and can be distributed to the intended group members using the common messaging facilities available in the specific communications system (such as SMS in a GSM network). The recipients of the group definition message can store the message in their subscriber stations for subsequent use.

It is thus typical for the present invention that group creation and membership management are handled at user level without interacting with the system. The role of the system is restricted to establishing a means for communicating with the group whenever there are users who have activated the communication group.

There is no need for the system to store and maintain information on such dynamic groups and their members except when the group is actually in use. This does not, however, prevent the system from applying access control checking to prevent unauthorized access to the groups.

The invention offers many advantages. The solution is simple from the network's point of view. Group creation and membership definition are managed between users using standard user-to-user communication facilities. No facilities are required in the system for centralized management of dynamic group definitions, and there is no need to provide remote access for mobile users to access this centralized function whenever they need to create new groups or add members. Thus, the present invention allows creating the group at the user level, which is where the need usually arises. Furthermore, there is no need to provide a mechanism for cleaning out obsolete groups from the system database. The solution is also simple from the user's point of view. Groups can be created and managed by sending standard messages, i.e. in a way similar to distributing electronic business cards (and ringing tones and logos). Thus, the present invention makes use of practices that are familiar to users of modern cellular networks, for example.

BRIEF DESCRIPTION OF THE DRAWINGS

In the following, the invention will be described in greater detail by means of the preferred embodiments with reference to the accompanying drawings, in which.

PREFERRED EMBODIMENTS OF THE INVENTION

The invention can be used in any modern communications system offering talk group communications. The invention is especially applicable in modern mobile radio systems supporting talk group communications. A particularly interesting communications system where the invention can be applied is a PMR over cellular (PMRoC) system or push-to-talk over cellular (PoC) system. PMRoC/PoC system will be briefly illustrated with reference to FIG. 5 below. For a more detailed description of PMRoC/PoC system, reference is made to a co-pending U.S. patent application Ser. No. 09/835,867, which is incorporated herein by reference.

Figure 1:
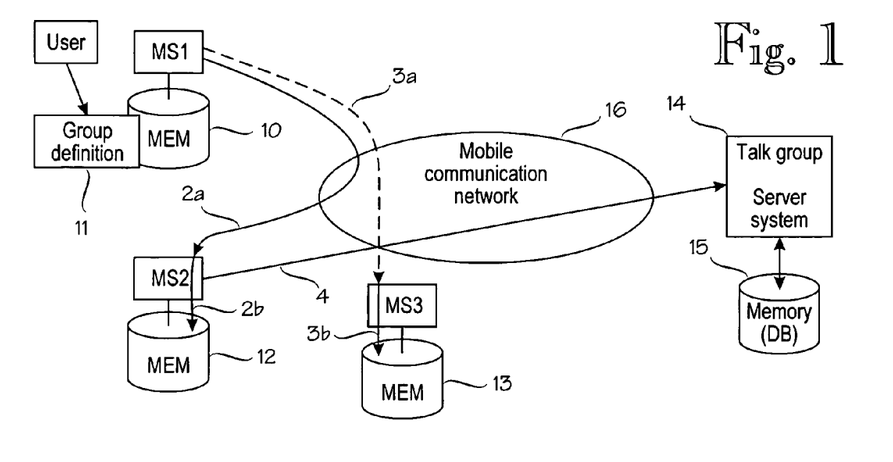
FIG. 1 illustrates a generic architecture of a communications system according to an embodiment of the invention.

The generic architecture of a communications system according to an embodiment of the invention is illustrated in FIG. 1. The communications system comprises a plurality of mobile stations capable of communicating in a mobile communications network 16. Although only three mobile stations are shown in FIG. 1 for the sake of clarity, the number of mobile stations in the communications system is not limited. The mobile stations MS1, MS2 and MS3 are also able to communicate in talk groups of at least one talk group service system located within or on top of the mobile communications network, such as a talk group server system 14. The talk group server system 14 can be any network element or a system comprising several functional and/or physical network entities implementing talk group communications, capable of maintaining voice traffic in talk groups between group members who have joined a talk group. In association with the talk group server system, said system also includes a memory or database 15, which represents any means for holding information needed by the talk group server system for talk group communications.

Figure 2:
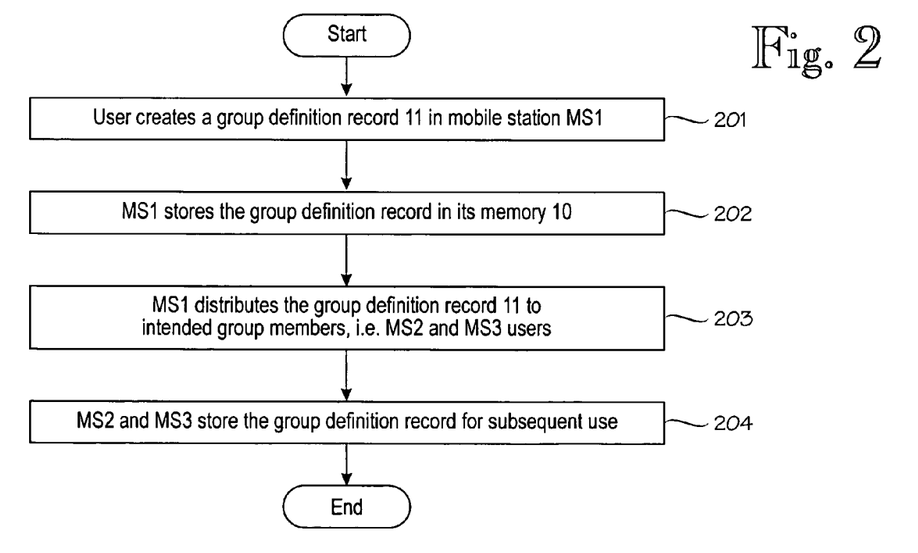
FIG. 2 is a flow diagram illustrating a group definition procedure according to an embodiment of the invention.

In accordance with the basic principles of the present invention, group creation and membership definition are managed between users using standard user-to-user communication facilities, such as a short message service or short data service. The dynamic group creation according to the invention will be illustrated in the following by means of an example described with reference to FIGS. 1 and 2.

At first, the user of the mobile station MS1 decides to create a group. The user of MS1 creates a group definition record 11 (step 201 in FIG. 2), which is then stored in a memory 10 of the MS1 (step 202). There are various ways to implement the creation of the group definition 11. The most obvious way is that the user inputs some kind of group identifier, typically a group name, and optionally some other information, such as security parameters. The user also defines the intended members of the talk group. The MS1 prepares the final group definition record 11 on the basis of the data inputted by the user. Thus, the group definition record 11 may contain, in addition to the group identifier or group name, e.g. a random part to make the group name unique, a password to add security, a base group identity to add security, and an identity of the user to allow more efficient handling of the group in the communications system. The mobile station MS1 prepares a group definition message containing the group definition information from the group definition record 11. The user of MS1 distributes, using the MS1, the group definition record in the group definition message to the intended group members (step 203). The MS1 can utilize any user-to-user communication facility offered by the mobile communications network 16 for sending the group definition message to the recipients. In the example illustrated in FIG. 1, group definition messages 2a and 3a are sent to the mobile stations MS2 and MS3, respectively. The mobile stations MS2 and MS3 each store the content of the group definition message in the form of a group definition record in a memory 12 and 13, respectively, attached to or contained in the mobile stations (step 204). Preferably, the group definition record is first displayed to the users of MS2 and MS3 who can then decide whether the group definition record is stored or not. It may also be possible that the users of MS2 and MS3 are able to further distribute the group definition message to new group members.

As is evident from the above example, the dynamic talk groups can be created and managed by sending messages between the users. In other words, the group creation and membership management are handled at a user level without interacting with the group communication facilities of the communications system on the network side. There is no need for the network side of the communications system to store and maintain information on such dynamic talk groups and their members, except when the group is actually in use. In a similar manner as described above, any number of dynamic talk groups can be created in the mobile stations.

The group activation on the network side and group communication between the group members are procedures separate from the group creation and membership management described above. There may be a large number of dynamic talk groups defined and stored in the mobile stations, but typically only a few of them are actually activated on the network side of the communications system at a given time. The role of the infrastructure in the system is restricted to establishing means for communicating in a dynamic talk group, and to store and maintain information on such a dynamic talk group and its members only when such users who have activated the group for communication are concerned.

Figure 3:
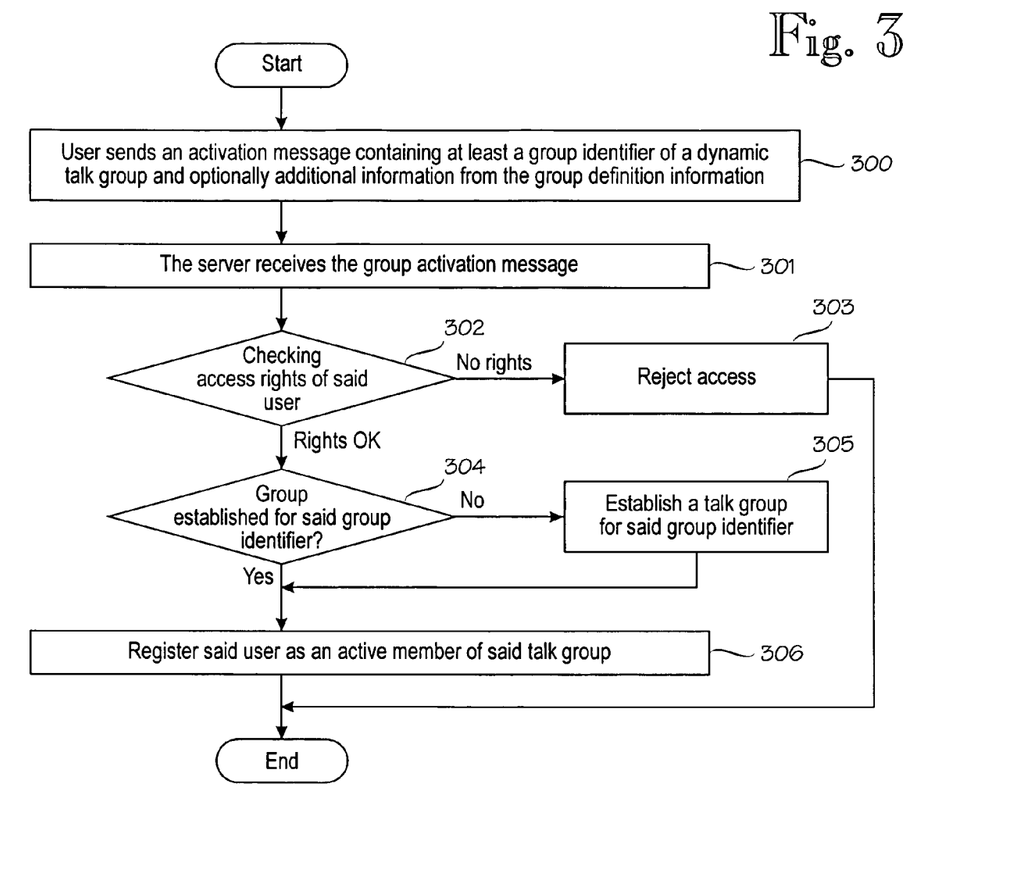
FIGS. 3 and 4 are flow diagrams illustrating the group activation and deactivation procedures, respectively, according to an embodiment of the invention.
Figure 4:
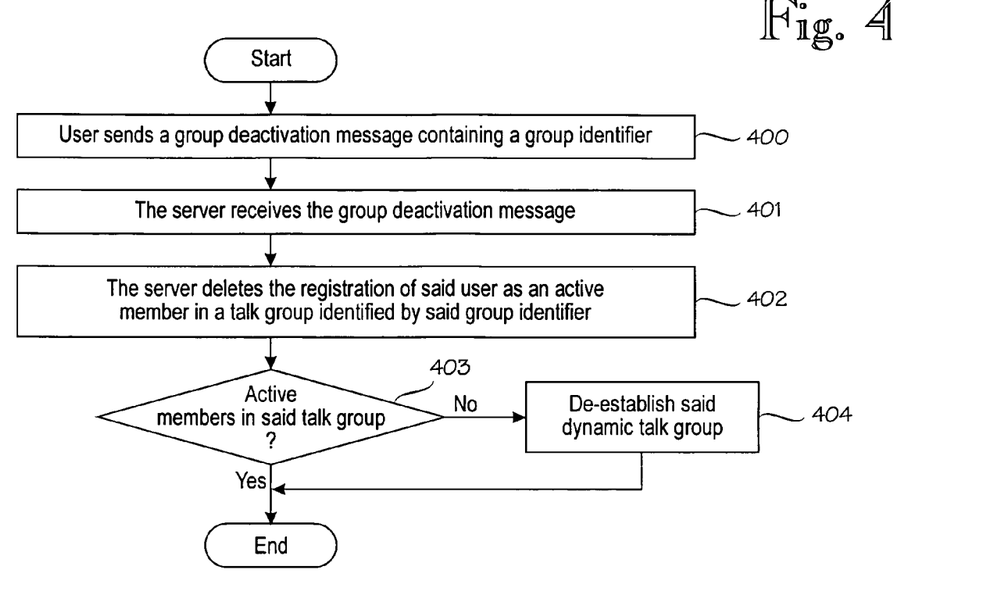

The group activation and deactivation will be now described by means of an example and with reference to FIGS. 1, 3 and 4.

Let us assume that the user of the mobile station MS2 decides to activate the dynamic talk group, which has been previously created and stored in a manner described above. The user selects the talk group to be activated and triggers the mobile station MS2 to inform the network side of the communications system that the user wants to join the specific dynamic talk group for communication. At this end, the MS prepares and sends an activation message 4 to the network facility (facilities) implementing the talk group communications on the network side, such as the talk group server system 14 (step 300 in FIG. 3). The activation message 4 contains the group identifier of the dynamic talk group and optionally additional information from the group definition record stored in the memory 12 of the MS2. This additional information preferably contains security-related information, as will be described in more detail below. The talk group server system 14 receives the group activation message (step 301) and, in the preferred embodiment of the invention, checks the rights of the specific user to access and activate the dynamic talk group identified by the group identifier (step 302). The checking of the access rights is preferably based on additional security information contained in the activation message 4, as will be described in more detail below. If the user sending the activation message 4 has no rights for accessing and activating the specific talk group, the attempt to access is rejected (step 303).

If the user has access rights, the talk group server system 14 checks whether the talk group identified by the group identifier has already been established in the communications system in response to the reception of an activation message from any other member(s) of the talk group (step 304). If no talk groups have been established, the talk group server 14 establishes a talk group for the group identifier (step 305) and registers the user as an active member of the established talk group (step 306). However, if the talk group server 14 observes in step 304 that a group has already been established for the group identifier, the talk group server 14 only registers the user as an active member of the already established talk group (step 306), which may also include configuration in the server system 14. The establishment and activation of a dynamic talk group generally refer to all arrangements necessary to support the communication in the group between the group members, who have activated the group. It is not essential to the present invention which specific measures and means are required. This depends on the requirements of the specific communications system in which the present invention is applied. However, typically the establishment of the talk group requires that at least some information on a dynamic talk group and its active members is stored and maintained on the network side. In FIG. 1, the storage of such information is implemented using the memory or the database 15.

Each user must activate the group by a separate activation message in order to join the group communication. A user who is currently an active member of the group can at any time send a deactivation message in order to deactivate his membership in the group (step 400 in FIG. 4). The deactivation message contains at least a group identifier and optionally similar security information as the activation message. The server receives the group deactivation message (step 401) and deletes the registration of the user as an active member in the talk group identified by the group identifier (step 402).

It is also preferable to de-establish a talk group on the network side immediately when the talk group no longer includes active members. Therefore, a mechanism is needed for monitoring the number of active members. In an embodiment of the invention, when a user is deactivated in a talk group, the talk group server system 14 further checks whether there are still active members in the specific talk group (step 403). If there are no active members left in the talk group, the talk group is de-established (step 404). The de-establishment of the group in the communications system includes releasing resources and erasing all information relating to the specific talk group on the network side of the communications system. In the example illustrated in FIG. 1, the information on the dynamic talk group and its members stored in the memory 15 are deleted. Thus, only relevant group information is stored in the system database and there is no need to provide a separate mechanism for cleaning out obsolete groups from the system database. However, it should be noted that the talk group definition records 11 relating to the de-established talk group is still maintained and stored in the memories of the mobile stations. Therefore, the talk group can be easily re-established in the communications system at any time. The deletion of the talk group definition record 11 stored in the mobile station is made only by the user of the mobile station. If a user of one mobile station deletes a talk group permanently, information on that may be delivered to other members of the group.

In case the system responsible for the group communication consists of more than one identical elements, each capable of handling e.g. a certain number of groups, a need is created to allocate a network element for each new talk group. Because the dynamic talk group is not known to the system before the need to communicate arises, the talk group cannot be defined in the system database but it has to be determined from the information contained in the group definition included in the activation message. It is possible in a distributed system that group activations arrive, from different members, at different parts of the system, and each of these group activations must then result in the group established in the same network element. If all network elements are identical and equal (e.g. all are located in the same location), then the network element could be derived from the group identifier using e.g. a hash algorithm. Usually, traffic planning considerations will cause unnecessary load to the system. Therefore, in an embodiment of the invention, a method enabling the system operator to control the allocation of new groups into the network elements is employed. If the group definition in the activation message includes a base group identifier, then the dynamic group will be established in the same network element as the base group. If the group definition in the activation message does not include a base group identifier, then the identity of the user who originally created the group will be incorporated into the group definition message and the group activation message, and will be used by the communications system to allocate the specific network element for the new group.

As described above, the user who creates the talk group chooses a name or other group identifier for the users. The users and the communications system have contradictory requirements for the group names and the group identifiers. In the user's point of view the group name or group identifier has to be meaningful for the users. On the other hand, the communications system points out that the talk group needs an identifier, which is unique in the communications system. However, a meaningful group name, chosen by a user, is often not likely to be unique. Therefore, in an embodiment of the invention, the mobile station creates a unique identifier from the group name supplied by the (group-creating) user. There are several ways to implement such a functionality. Sometimes, additional information is provided that is associated with the group name to create a unique identifier. As explained in more detail below, such additional information may include a password, a base group identifier, a closed user group identifier, a user identity of the user who created the talk group, etc. If there is no such information associated with the group name, then the mobile station can append a random part to the group name for this purpose. Such a random part may be a random number generated by the mobile station. In the approach according to the present invention, the access control of the groups (and thereby security) is intrinsically weaker than in a centralized network-oriented solution. Also, even if the solution makes it easy to admit new members to a talk group by distributing the group definition message, the removal of a member from the group is not easy to implement reliably. The security problem is alleviated in cases where a dynamic group is needed for a limited period of time or when the security requirements are restricted. These are also the primary application fields of the present invention. As the invention is typically implemented in the communications systems supporting also the conventional permanently created system-controlled talk groups having higher security, this other type of talk groups is generally used when the security requirements are high.

However, it is possible to improve the security in some degree by using additional security features. In the basic form of the invention the security (i.e. the access control to the group) is dependent on what is known about the contents of the group definition message. The additional mechanisms to improve the security are based on the associated additional information to the group definition. As noted above, such additional information may also implicitly serve to create a unique group identifier without a need for an explicit random part.

The first mechanism to improve security is the use of passwords. The group-creating user gives a password (such as a PIN code) for the group. The password is stored within the group definition message in an encrypted form. Access to the talk group is only allowed by the communications system if the user activating the talk group gives the right password. The security of this approach is limited because it is possible to find the password with brute force attack. If the talk group is used for a limited period of time only, and/or for communications of non-critical nature, this method is suitable because of its simplicity.

A second mechanism to improve security is the use of a base group. This approach assumes that the communications system also supports conventional talk groups that are provisioned into the communications system itself with an access right control based on the information in the system database. If a group definition message includes a base group identifier, this can be used by the communications system to perform an additional access rights checking. A user attempting to activate a dynamic talk group using a group definition containing a base group identifier will only be allowed to access the talk group if the specific user is allowed to have access to the base group. It should be noted that the base group identifier effectively forms part of the dynamic group identity. Therefore, it is not possible to circumvent the access control checking by tampering with the group definition data by removing the base group identifier, because such tampering would only allow access to the group with the modified identity not to the restricted group.

A third mechanism to improve security is the use of a closed user group. If the communications system supports closed user groups, it is possible to restrict access to the dynamic groups according to the present invention either by including a closed user group identifier in the group definition message, or by imposing a check that all group members will have to belong to the same closed user group.

Figure 5:
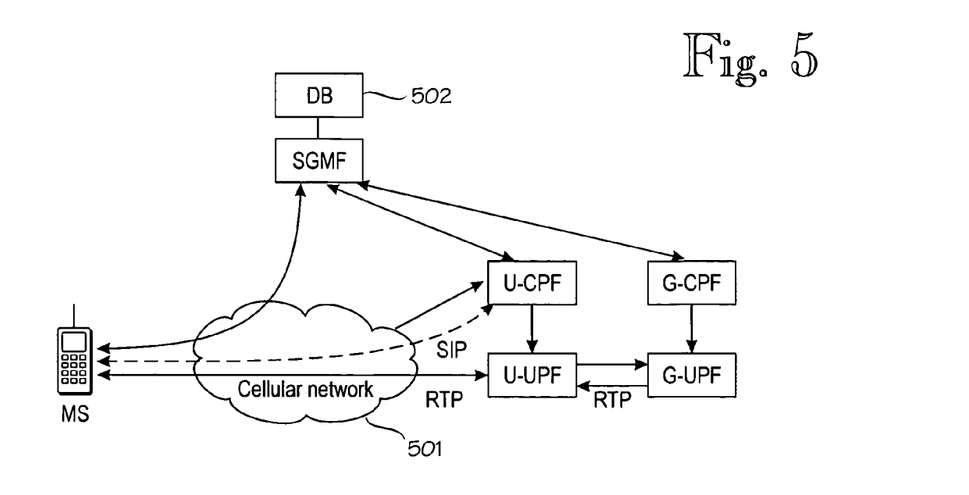
FIG. 5 illustrates the architecture of a PMRoC/PoC system where the present invention can be applied.

One application of the present invention is a PMRoC or PoC system in which a group communication functionality is provided on top of a cellular network. The basic principles of the PMRoC/PoC system is described in the co-pending U.S. patent application Ser. No. 09/835,867 which is incorporated herein by reference. An example of the PMRoC/PoC architecture is illustrated in FIG. 5. In FIG. 5 the PoC system consisting of several functional entities is provided on top of the cellular network 501. The PoC can also be seen as a core network using the cellular network 501 as a radio access network. In the terms of FIG. 1, the PoC system implements the talk group server system 14 and the memory 15. The user functionality runs over the cellular network 501, which provides the data transfer services for the PoC system. Optionally there may be interfaces to cellular network database and billing systems from the PoC core network, but otherwise the PoC is just an IP-based application from the point of view of the underlying cellular network 501.

The PoC is preferably a voice over IP (VoIP) application. In such a case the PoC is preferably designed to follow the IETF Internet reference models, protocols and best practices. Compatibility to the IETF standards or draft standards is preferably maintained. The PoC network functional entities are preferably composed in a similar manner as main stream IP (Internet Protocol)-based architectures. The control, user and management planes are logically and physically separated from each other.

The control, user and management planes are connected to each others via several IP technologies, such as SIP (Session Initiation Protocol) for control plane signaling, RTP (a transport protocol for real-time applications) in the user plane. Although the functional entities are separated from each other, IP connection technologies provide the means for placing the functional entities in the same physical device, if needed.

The PoC core network contains the following functional entities: user control-plane-function (U-CPF), group control-plane-function (G-CPF), user user-plane-function (U-UPF), group user-plane-function (G-UPF), subscriber and group management function (SGMF) and PoC database 502. The U-CPF and G-CPF are the control plane functional entities. The U-CPF handles user-related control plane functions. Each user has one pre-assigned U-CPF which is used regardless of the user's physical location. All user signaling first moves from the mobile station MS to the user's U-CPF. The G-CPF handles group-related control plane functions and keeps track of the group members. One G-CPF is assigned for each group when the group is created. The U-UPF and G-UPF are user plane functional entities. U-UPF is involved in real-time traffic distribution for users. Each user has a U-UPF (assigned at logon) and all real-time traffic goes through this U-UPF. The G-UPF handles group-related user plane functions, i.e. it handles real-time traffic in groups and takes care of speech item distribution. Each group belongs to one G-UPF. The SGMF handles the management plane function, i.e. it deals with user and group management. The static information of the system is saved into the PoC database 502. The control plane, e.g. the U-CPF and G-CPF, ask and save data from/to the PoC database 502 via the SGMF.

The static group sessions are established partly when a group is provisioned and partly when subscribers are attached to the groups. After that, group members can talk to each other just by pushing the push-to-talk button (PTT). No control plane signaling is needed anymore in said phase. The necessary service-related information is embedded inside the same user plane packets, where speech is transferred.

The underlying cellular network can be, for example, a general packet radio system (GPRS) or a third generation (3G) radio access network. No relation between the GPRS (or 3G) call control and the PoC call control is required. Both have specific call control mechanisms. The mobility of the users is totally handled by the underlying cellular network. The PoC system does not handle the mobility issues at all. When the user moves in the network, the user's U-CPF and U-UPF remain the same. If the GPRS is used as a transmission network, the GPRS context is always on. When the user pushes the PTT, radio resources are reserved by the GPRS, but no signaling is needed anymore to open the GPRS PDP context.

When the present invention is applied in the PoC system, any suitable message service/protocol (such as TETRA SDS (short data service), GSM SMS (short message service), and SIP) can be used for carrying the group definition messages between the users. PoC SIP protocols can be used for carrying group activation and deactivation messages. The group communications themselves can be based on the technology used in the PoC system for group communication, such as RTP. Different possibilities exist for the format and coding of the group definition messages and for incorporation of the group definition into the group activation message. If SIPurl is used for the group identifier format, then it is possible to append additional information to the url, thus creating a unique url for the dynamic talk group.

The following example illustrates how the group activation phase can be implemented in the PoC system. Before any user joins a dynamic talk group, one (group-creating) user has sent the group definition messages to other users in order to create a group. The PoC core network is not aware of the contents of these messages.

When a group member decides to activate a dynamic talk group, he sends a SIP group activation message to his U-CPF. The group activation message may contain an indication that it is a request to join a dynamic talk group, information about who was the creating-user for this dynamic talk group (an URL) and a unique name (URL) for the group (for example, SAILCLUB-UdtP9zZy3VM@poc.fi, where the random part UdtP9zZy3VM is created using a PIN code and an algorithm.

At the reception of the SIP group definition message, the U-CPF contacts the SGMF for checking, whether this user has the right to attend the dynamic talk groups. At this end, the U-CPF sends the URLs of this user and the group-creating user to the SGMF. The SGMF also checks which is the G-CPF for the group-creating user in the case of dynamic talk groups. The SGMF returns the result of the right checking and the G-CPF name to the U-CPF. If the access rights are not appropriate, the access attempt is rejected. If the access rights are appropriate, the user is registered as an active member of the group into the PoC system, and if the user is the first user in the PoC system, the associated U-UPF, G-CPF, and G-UPF are arranged to support this dynamic talk group. The group may be established in the G-CPF and G-UPF of the user who initially created the group. Also the U-UPF may be configured to support traffic to and from the G-UPF and to find the dynamic group. The G-CPF monitors the number of active members in the dynamic group, and if there are no active members in the group left after deactivating the user, the G-CPF initiates a procedure which de-establishes the dynamic talk group in the PoC system.

The description only illustrates the preferred embodiments of the invention. The invention is not, however, limited to these examples, but it may vary within the scope and spirit of the appended claims.

What is claimed is:

1. A method for dynamically creating talk groups in a communications system, comprising
defining a dynamic talk group by a user of a first subscriber station, said group having at least two group members including said user,
sending a group definition message from said first subscriber station to subscriber stations of other members in said group, said group definition message containing group definition information which includes at least a group identifier,
storing said group definition information in said subscriber stations for subsequent use,
creating a password for said dynamic talk group by said user,
encrypting said password in said first subscriber station,
delivering said encrypted password to said other members of said dynamic talk group in said group definition message,
storing said password in said subscriber stations of said other members,
using said password as an authorization to access said dynamic talk group when any one of said members in said dynamic talk group registers as an active member of said dynamic talk group in said system.

2. A method according to claim 1, comprising
including in said group definition information on a base group identifier defining a base talk group provisioned into the communications system itself,
sending said base group identifier in said group activation message to said communications system,
a user attempting to activate said dynamic talk group with said group activation message is allowed to access said dynamic talk group only if the respective user has the access right to said base talk group.

3. A method according to claim 1, comprising
including in said group definition information a closed user group identifier defining a closed user group provisioned into the communications system itself,
sending said closed user group identifier in said group activation message to said communications system,
a user attempting to activate said dynamic talk group with said group activation message is allowed to access said dynamic talk group only if the respective user belongs to the same closed user group.

4. A method according to claim 1, comprising
including in said group definition information on a base group identifier defining a base talk group provisioned into the communications system itself,
sending said base group identifier in said group activation message to said communications system,
establishing said dynamic talk group in a network element where said base group has been established.

5. A method according to claim 1, comprising
including in said group definition information on a user identity of said user in said first subscriber station,
sending said user identity in said group activation message to said communications system,
using said user identity for selecting one of two or more network elements in said communications system to establish said dynamic talk group.

6. A method according to claim 1, comprising
each member of said dynamic talk group separately registering as an active member by sending a group activation message to said communications system,
in response to the reception of a group activation message, said dynamic talk group is established in said communications system, if the group is not already established by an earlier group activation message, and said member who sent said group activation message is registered as an active member in said dynamic talk group.

7. A method according to claim 1, comprising
de-establishing said dynamic talk group established in said communications system in response to having no active members in said dynamic talk group.

8. A subscriber station for a communications system, comprising
user-operated means for defining a dynamic talk group including a user of the subscriber station,
means for sending a group definition message to subscriber stations of intended other members of said defined dynamic talk group over a communication network, said group definition message containing group definition information which includes at least a group identifier,
means for storing said group definition information and possible other group definition information on one or more other talk groups received from any other subscriber station, for subsequent use,
means for creating a password for said dynamic talk group by said user,
means for encrypting said password,
means for delivering said encrypted password to said other members of said dynamic talk group in said group definition message, means for using said password as an authorization to access said dynamic talk group.

9. A subscriber station for a communications system, comprising
- user-operated means for defining a dynamic talk group including a user of the subscriber station,
- means for sending a group definition message to subscriber stations of intended other members of said defined dynamic talk group over a communication network without involvement of a group communication service, said group definition message containing group definition information which includes at least a group identifier,
- means for storing, for subsequent use, said group definition information and possible other group definition information on one or more other talk groups received from any other subscriber station over a communication network without involvement of a group communication service.

10. A communications system, comprising
- a communication network,
- a group communication service,
- a plurality of subscriber stations, at least some of said subscriber stations comprising
  - i) user-operated means for defining a dynamic talk group including a user of the respective subscriber station,
  - ii) means for sending a group definition message to subscriber stations of the intended other members in said defined dynamic talk group over said communication network without involvement of said group communication service, said group definition message containing group definition information which includes at least a group identifier,
  - iii) means for storing, for subsequent use, said group definition information and possible other group definition information on one or more other talk groups received from any other subscriber station of said communication network without involvement of said group communication service.

11. A communications system according to claim 10, comprising
- said talk group communication service system being arranged to de-establish said dynamic talk group established in said communications system in response to having no active members in said dynamic talk group.

12. A communications system according to claim 10, wherein
- said group definition information contains a base group identifier defining a base talk group provisioned by said talk group communication service system itself,
- said group activation message contains said base group identifier,
- said talk group communication service system allows a user to access said dynamic talk group only if the respective user has the access right to said base talk group.

13. A communications system according to claim 10, wherein
- said group definition information contains a closed user group identifier defining a closed user group provisioned by said talk group communication service system itself,
- said group activation message contains said closed user group identifier,
- said talk group communication service system allows a user to access said dynamic talk group only if said user belongs to the same closed user group.

14. A communications system according to claim 10, wherein
- said group definition information contains a user identity of a user who created said dynamic talk group,
- said group activation message contains said user identity,
- the communications system utilizes said user identity for selecting one of the system entities within said talk group communication service system to establish said dynamic talk group.

15. A communications system according to claim 10, wherein
- said group definition information contains a base group identifier defining a base talk group provisioned by one of the system entities within said talk group communication service system,
- said group activation message contains said base group identifier,
- said one of said system entities where said base group has been provisioned establishes said dynamic talk group.

16. A communications system according to claim 10, wherein said communication network is a cellular mobile network, and wherein said talk group communication service system is on top of said cellular mobile network.

* * * * *